United States Patent
Lai

(10) Patent No.: US 8,446,704 B2
(45) Date of Patent: May 21, 2013

(54) TIMING DEVICE WITHOUT NEUTRAL LINE

(76) Inventor: Li-Chun Lai, New Taipei (TW)

( * ) Notice: Subject to any disclaimer, the term of this patent is extended or adjusted under 35 U.S.C. 154(b) by 361 days.

(21) Appl. No.: 13/014,067

(22) Filed: Jan. 26, 2011

(65) Prior Publication Data

US 2012/0188808 A1 Jul. 26, 2012

(51) Int. Cl.
*H04M 3/18* (2006.01)

(52) U.S. Cl.
USPC .............................. 361/119; 315/224; 307/66

(58) Field of Classification Search
USPC ............. 307/64, 66, 104, 105, 108, 125, 130, 307/141; 363/16–20, 34, 37, 39, 49, 65, 124, 363/128, 142; 713/300, 340; 315/186, 144, 315/224, 291, 294, 207, 307; 361/56, 96, 361/100, 102, 119
See application file for complete search history.

(56) References Cited

U.S. PATENT DOCUMENTS

| | | | | |
|---|---|---|---|---|
| 3,814,948 A | * | 6/1974 | Schuchmann et al. | 307/141 |
| 4,028,613 A | * | 6/1977 | Stiller et al. | 323/300 |
| 4,224,563 A | * | 9/1980 | Hardy | 315/308 |
| 5,726,853 A | * | 3/1998 | Chavannes | 361/119 |
| 6,008,973 A | * | 12/1999 | Dunne et al. | 361/93.6 |
| 6,862,162 B2 | * | 3/2005 | Casey | 361/91.1 |

* cited by examiner

*Primary Examiner* — Rajnikant Patel
(74) *Attorney, Agent, or Firm* — Ming Chow; Sinorica, LLC

(57) ABSTRACT

A timing device without a neutral line is disclosed, comprising a hot line (L line) input, a hot line (L line) output, a second filter module, a triac, a current limiting module, a current rectifying module, a SCR, a first filter module, a MCU, a display module, an operation interface module, and a power input module provides the power required for entire operations. And, the operation interface module can input the control signal into the MCU and further output a signal to the second filter module for filtering to conduct the SCR and finally through the current rectifying module and the current limiting module to conduct the triac. Therefore, the current can enter into the AC output for providing electronic power.

10 Claims, 2 Drawing Sheets

TIMING DEVICE WITHOUT NEUTRAL LINE

BACKGROUND OF THE INVENTION

1. Field of the Invention

The present invention relates to a timing device without neutral line (N line); in particular, it relates to a power outlet timing device which does not contain a neutral line (N line).

2. Description of Related Art

At present, in order to replace a mechanical switch, which needs to be switched on and off manually into an electronic timer as a switch, which can turn on and off automatically, there are two ways:

1. In a conventional electronic timer, the hot line (L line) and neutral line (N line) have to connect to a circuit control board. Which means it only can work with a neutral line (N line). However, a mechanical switch in general buildings does not have neutral line (N line) buried previously since a mechanical switch doesn't need a neutral line. Therefore, a conventional electronic timer cannot operate with a mechanical switch.

2. At present, some timers in market are designed without a neural line (N line), which increases the battery voltage and then stores it in a capacitor, further by the H-bridge circuit to drive the electromagnet on the circuit board; in case the electromagnet produces magnetic, the power output pin and power input pin become conductive; in case the electromagnet does not produce magnetic, the power output pin and power input pin do not become conductive. Hence, the mechanical switch can be driven by the electromagnet. However, it usually requires a complex circuitry construction for this kind of timers.

In market, a timer is either working with a neutral line or has complex circuitry construction to drive the mechanical switch, which would increase a lot of manufacturing costs. Consequently, it would be an optimal solution to provide a non-neutral line (N line) timing device which can overcome the problem of not being able to use a power outlet timing device in a building environment without a neutral line, and also have a simple circuitry construction.

SUMMARY OF THE INVENTION

An objective of the present invention is to provide a timing device without a neutral line (N line); which can overcome the problem of not being able to use a power outlet timing device without a neutral line in a building.

Another objective of the present invention is to provide a timing device without neutral line, having a simple circuitry construction.

A timing device without neutral line (N line) enabling achievements of aforementioned objectives comprises: a power input module, used to provide the electric power required for entire operations; an operation interface module, connected to the power input module in order to set up the time for providing electronic power or not and output the controlled signal; a MCU, respectively connected to the power input module and the operation interface module, receiving and reading the signal of setting time from the operation interface module, when it meets the timing, the MCU would output a driven signal; a first filter module, respectively connected to the power input module and the MCU and capable of receiving the driven signal from the MCU and filtering the signal; a SCR, respectively connected to the power input module and the first filter module and being non-conductive normally, and being conductive, as the SCR received the signal from the first filter module, in order to output the signal; a current rectifying module, respectively connected to the power input module and the SCR, receiving the driven signal from SCR and output the signal after rectifying; a current limiting module, respectively connected to the power input module and the current rectifying module, receiving the rectified signal from the current rectifying module, and limiting the rectified signal flowing out; a triac, respectively connected to the power input module and the current limiting module, being non-conductive in normal and being conductive as receiving the limited signal from the current limiting module; a hot line input, respectively connected to the hot line point of the AC power input; a second filter module, respectively connected to the hot line input and the triac, receiving the AC signal from the hot line input and filtering the received signal, and further transmitting the AC signal to the triac; a hot line output, respectively connected to the triac and the hot line point of the AC output, which, in case of conductivity in the triac, allows a signal from the hot line point of the AC input transmit through the hot line input, the second filter module, the triac and the hot line output and end up entering into the hot line point of the AC output, which allows the AC output produces electric power.

In one embodiment of the present invention, the operation interface module can be a key or a knob.

In one embodiment of the present invention, the timing device without neutral line comprises a display module, which is connected to the power input module and the MCU to display the time setting by the operation interface module.

In one embodiment of the present invention, the display module is a LCD.

In one embodiment of the present invention, the first filter module includes a resistor and a capacitor thereby forming an RC filter circuit.

In one embodiment of the present invention, the second filter module includes an inductance and a capacitor thereby forming an RC filter circuit.

In one embodiment of the present invention, the current limiting module includes two current limiting resistors.

In one embodiment of the present invention, the current rectifying module includes four diodes thereby forming a H-bridge rectifying circuit.

In one embodiment of the present invention, the SCR further comprises a control gate, which is connected to the first filter module, wherein a anode (A) and a cathode (K) are connected to the current rectifying module, in case of receiving the signal from the first filter module, the anode (A) and the cathode (K) will be conducted, so as to output the signal to the current rectifying for rectifying.

In one embodiment of the present invention, the triac further comprises a control gate, which is connected to the current limiting module, wherein an electrode is connected to the second filter module; wherein another electrode is connected to the hot line output, in case of the control gate is triggered, the two electrodes are conducted and allows the signal of hot line point of the AC input goes through the two electrodes of the triac.

DETAILED DESCRIPTION OF THE PREFERRED EMBODIMENTS

The aforementioned and other technical contents, aspects and effects in relation with the present invention can clearly be appreciated through the detailed descriptions concerning the preferred embodiments of the present invention in conjunction with the appended drawings.

Figure 1:
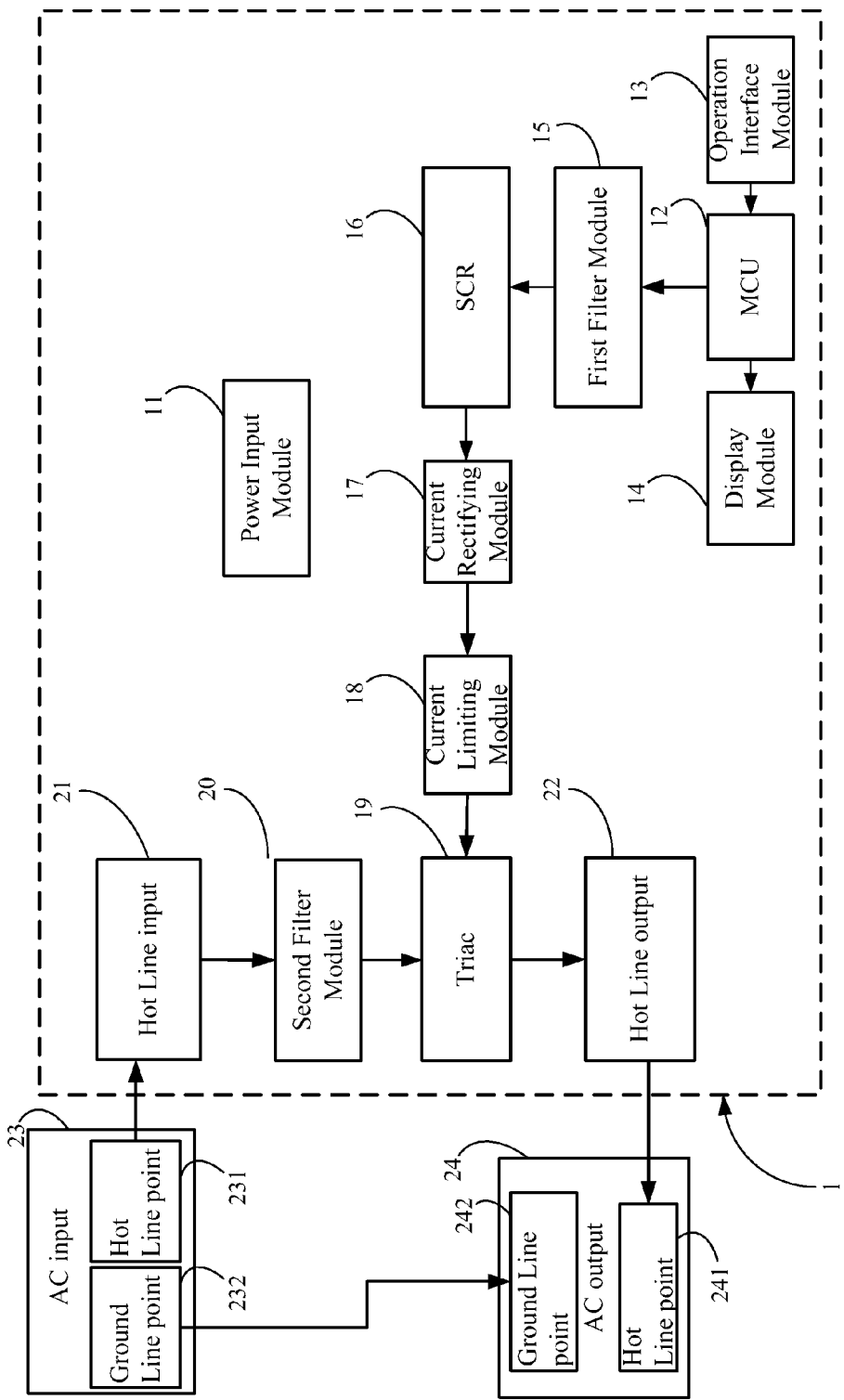
FIG. 1 shows a diagram for the integral architecture of the timing device without neutral line according to the present invention.
Figure 2:
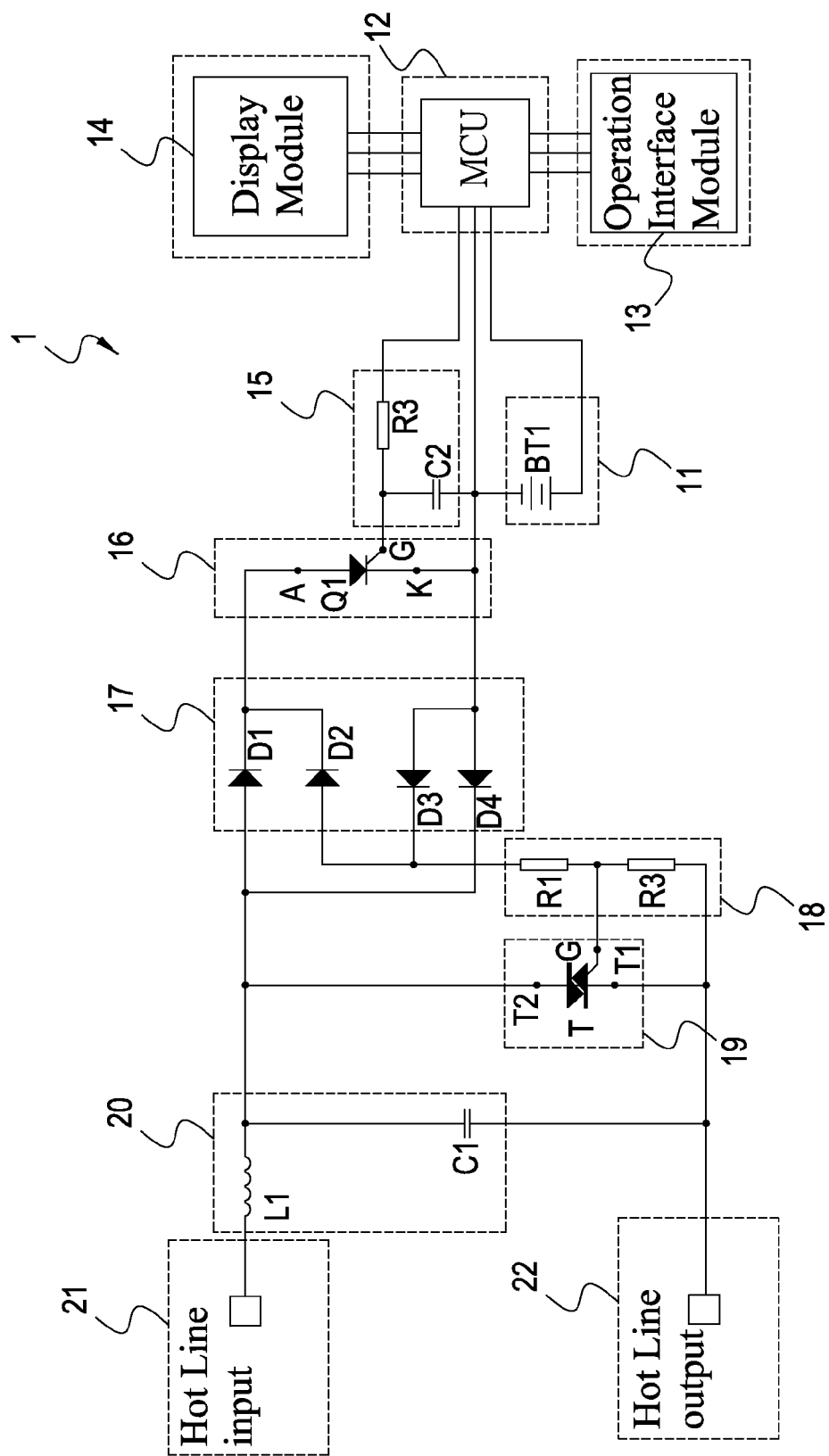
FIG. 2 shows a diagram for the circuit implementation of the timing device without neutral line according to the present invention.

Refer now to FIGS. 1 and 2, wherein a diagram of the integral architecture and a diagram of the circuit implementation for the timing device without neutral line according to the present invention are shown, and it can be seen that the timing device without neutral line 1 comprises:

a power input module 11, used to provide the electric power required for entire operations, wherein the power input module 11 can be a rechargeable battery, a dry battery or a Lithium battery;

a operation interface module 13, respectively connected to the power input module 11 in order to set up the time for providing electronic power or not; wherein the operation interface module 13 can be a key or a knob;

a MCU 12, respectively connected to the power input module 11 and the operation interface module 13, receiving and reading the signal of setting time from the operation interface module 13, when it meets the timing, the MCU 12 would output a driven signal;

a display module 14, connected to the power input module 11 and the MCU 12, displaying the time setting by the operation interface module 13, which is transmitted through the MCU 12 to the display module 14; wherein the display module can be a LCD;

a first filter module 15, respectively connected to the power input module 11 and the MCU 12 and capable of receiving the driven signal (controlled current) from the MCU 12 and filtering the signal in order to limit the driven signal (controlled current) from the MCU 12; wherein the first filter module includes a resistor $R_3$ and a capacitor $C_2$;

a SCR 16, respectively connected to the power input module 11 and the first filter module 15 and being non-conductive in normal, and being conductive, as the SCR(Q1) 16 received the signal from the first filter module 15, in order to output the signal; wherein the filtered output signal can prevent the SCR 16 from being burn down;

a current rectifying module 17, connected to the power input module 11 and the SCR 16, receiving the driven signal from the SCR 16 and output the signal after rectifying; wherein the current rectifying module 17 includes four diodes ($D_1, D_2, D_3, D_4$) in order to form a H-bridge rectifying circuit;

a current limiting module 18, connected to the power input module 11 and the current rectifying module 17, receiving the rectified signal from the current rectifying module 17, and limiting the rectified signal flowing out;

a triac 19, respectively connected to the power input module 11 and the current limiting module 18, being non-conductive in normal and being conductive as receiving the limited signal from the current limiting module 18;

a hot line input 21, respectively connected to the hot line (L line) point 231 of the AC input 23;

a second filter module 20, respectively connected to the hot line input 21 and the triac 19, receiving the AC signal from the hot line input 21 and filtering the received signal and further transmitting the AC signal to the triac 19. And also, the second filter module 20 can stop the high-frequency interference signal of hot line (L line) input 21, which prevents the triac 19 from being burn down; wherein, the second filter module 20 includes a inductance $L_1$ and a capacitor $C_1$;

a hot line output 22, respectively connected to the triac 19 and the hot line point 241 of the AC output 24; when users set up the time of providing current or cutting current by the operation interface 13, the MCU 12 can receive the time setting data from the operation interface 13 and output a controlled signal to the display module 14 to show the setting data of the operation interface 13; in addition, the MCU 12 would output a driven controlled signal, which enters into the first filter module 15 for filtering, conducts the SCR(Q1) 16, goes through the current rectifying module 17 for rectifying and through the current limiting module 18 for limiting, also conducts the triac (T) 19. The signal of hot line point 231 of AC input 23 could transmit to the hot line point 241 of the AC output 24 by through the hot line input 21, the second filter module 20, the triac 19 and the hot line output 22. As of the ground line point 232 of the AC input 23, it is connected directly to the ground line point 242 of the AC output 24, thereby allowing the AC output can provide electronic power.

Furthermore, refer to FIG. 2, the control gate (G) of the SCR 16 is connected to the first filter module 15, wherein the anode (A) and the cathode (K) are connected to the current rectifying module 17, in case of receiving the signal from the first filter module 15, the anode (A) and the cathode (K) would be conducted, so as to output the signal to the current rectifying 17 for rectifying.

Moreover, refer to FIG. 2, the control gate (G) of the triac 19 is connected to the current limiting module 18, wherein, an electrode $T_1$ is connected to the second filter module 20 and another electrode $T_2$ is connected to the hot line output 22. As of the control gate of the triac 19 is triggered, the electrode $T_1$ and the electrode $T_2$ would be conducted and allows the signal of hot line point of the AC input transmit through the two electrodes $T_1$ and $T_2$ of the triac 19 to hot line output 22. Therefore, the triac 19 can be use as an switch.

Moreover, the current limiting module 18 can limit the current entering into the triac 19 and prevent from being burn down.

Moreover, the current rectifying module 17 can receive the AC controlled signal (controlled current) and transform into a DC controlled signal (controlled current), so that allows the SCR 16 to control the movement of triac 19.

Compared with prior art, the timing device without neutral line provided by the present invention further offers the following advantages:

1. the present invention can overcome the problems in unable using the power outlet timing device when the neutral line is not distributed in buildings and can increase the popularization of using timing device;

2. the present invention can reduce its manufacture costs based on the simple circuit construction of the timing device.

By way of the aforementioned detailed descriptions for the preferred embodiments according to the present invention, it is intended to better illustrate the characteristics and spirit of the present invention rather than restricting the scope of the present invention to the preferred embodiments disclosed in the previous texts. Contrarily, the objective is to encompass all changes and effectively equivalent arrangements within the scope of the present invention as delineated in the following claims of the present application.

What is claimed is:

1. A timing device without neutral line, comprising:
   a power input module, used to provide the electric power required for entire operations;
   an operation interface module, connected to the power input module in order to set up the time for providing electronic power;

a MCU, respectively connected to the power input module and the operation interface module, receiving and reading the signal of setting time from the operation interface module, when it meets the timing, the MCU will output a driven signal;

a first filter module, respectively connected to the power input module and the MCU and capable of receiving the driven signal from the MCU and filtering the signal;

a SCR, respectively connected to the power input module and the first filter module and being non-conductive normally, and being conductive as the SCR received the signal from the first filter module in order to output the driven signal;

a current rectifying module, respectively connected to the power input module and the SCR, receiving the driven signal from SCR and output a rectified signal after rectifying;

a current limiting module, respectively connected to the power input module and the current rectifying module, receiving the rectified signal from the current rectifying module, and limiting the rectified signal flowing out;

a triac, respectively connected to the power input module and the current limiting module, being non-conductive in normal and being conductive as receiving the signal from the current limiting module;

a hot line input, respectively connected to a hot line point of a AC input;

a second filter module, respectively connected to the hot line input and the triac, receiving a signal from the hot line input and filtering the received signal and further transmitting the signal to the triac;

a hot line output, respectively connected to the triac and a hot line point of a AC output, in case of conductivity in the triac, receiving the signal, which is transmitting from the hot line point of the AC input, the hot line input, the second filter module, the triac to the hot line output, and entering into the hot line point of the AC output in order to allow the AC output provide electronic power.

2. The timing device without neutral line according to claim 1, wherein the operation interface module can be a key or a knob.

3. The timing device without neutral line according to claim 1, further comprises a display module, which is connected to the power input module and the MCU to display the time setting by the operation interface module.

4. The timing device without neutral line according to claim 3, wherein the display module is a LCD.

5. The timing device without neutral line according to claim 1, wherein the first filter module includes a resistor and a capacitor thereby forming an RC filter circuit.

6. The timing device without neutral line according to claim 1, wherein the second filter module includes an inductance and a capacitor thereby forming an RC filter circuit.

7. The timing device without neutral line according to claim 1, wherein the current limiting module includes two current limiting resistors.

8. The timing device without neutral line according to claim 1, wherein the current rectifying module includes four diodes thereby forming a H-bridge rectifying circuit.

9. The timing device without neutral line according to claim 1, wherein the SCR further comprises a control gate, which is connected to the first filter module, wherein a anode (A) and a cathode (K) are connected to the current rectifying module, in case of receiving the signal from the first filter module, the anode (A) and the cathode (K) will be conducted, so as to output the signal to the current rectifying for rectifying.

10. The timing device without neutral line according to claim 1, wherein the triac further comprises a control gate, which is connected to the current limiting module, wherein an electrode is connected to the second filter module; wherein another electrode is connected to the hot line output, in case of the control gate is triggered, the two electrodes are conducted and allows the signal of hot line point of the AC input goes through the two electrodes of the triac.

* * * * *